UNITED STATES PATENT OFFICE.

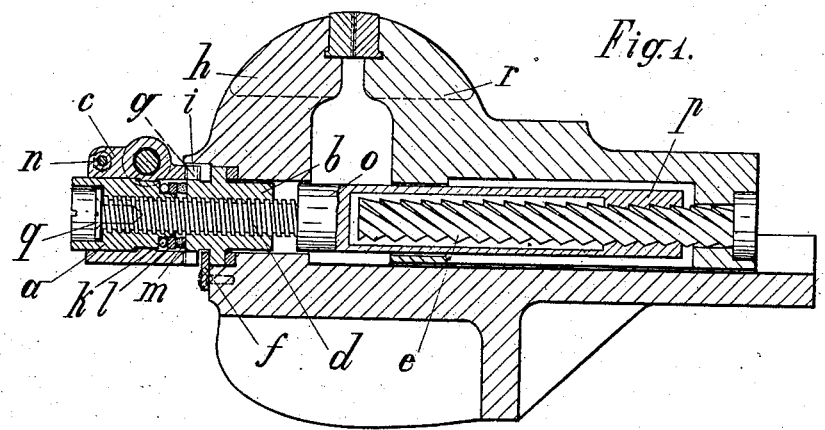
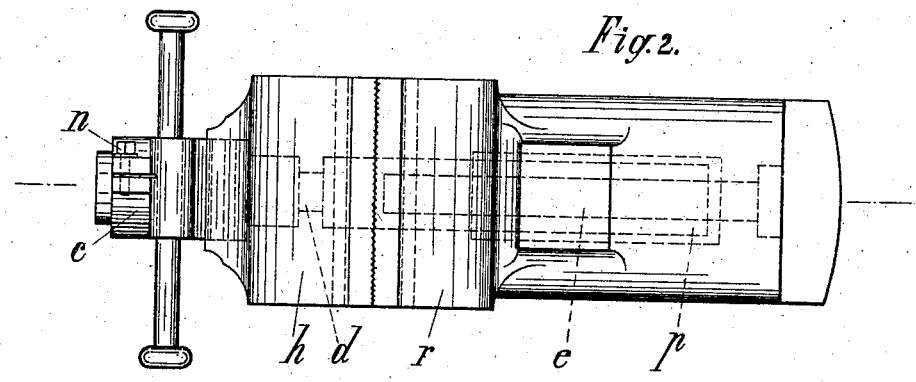
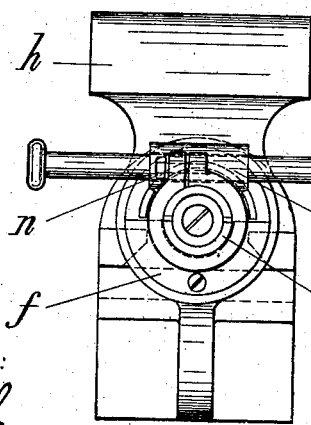
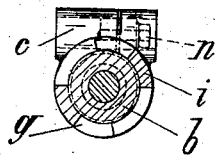

WILHELM BOLEY AND PAUL PFLEIDERER, OF ESSLINGEN, GERMANY.

VISE.

No. 849,968.      Specification of Letters Patent.      Patented April 9, 1907.

Application filed March 6, 1906. Serial No. 304,462.

*To all whom it may concern:*

Be it known that we, WILHELM BOLEY and PAUL PFLEIDERER, subjects of the Kingdom of Würtemberg, Germany, residing at Esslingen-am-Neckar, Nettingerstrasse N. 13, have invented certain new and useful Improvements in Vises; and we do hereby declare the following to be a full, clear, and exact description of the invention, such as will enable others skilled in the art to which it appertains to make and use the same.

This invention relates to a vise with two screw-spindles of considerably different pitch, that with the rapid pitch serving to adjust the jaw, while the other and lower-pitched spindle firmly secures the work as soon as the pressure of the jaws on the work is sufficient to overcome the resistance of a friction-coupling which connects the low-pitched screw with the tightening-nut.

The present invention differs from known vises of this kind by the arrangement of two nuts on the low-pitched screw-spindle which press one against the other, thereby rotating the low-pitch spindle and actuating the high-pitch spindle, while when the jaws begin to press on the work the friction produced by the counter-pressure of the nuts is overcome, and the nuts turn on the low-pitch spindle and firmly secure the piece of work.

The invention is illustrated in the accompanying drawings, in which—

Figure 1 is a longitudinal section of the vise; Fig. 2, a plan; Fig. 3, a front elevation, and Fig. 4 a detail sectional view.

The low-pitch spindle $d$ is made in one piece with a sleeve $o$, the end $p$ of which acts as a nut for the higher-pitched spindle $e$, which is fixed on the movable jaw $r$.

On the spindle $d$ is a tension-nut $b$, which is held in its place in the jaw of the vise in the usual manner by means of a plate $f$, screwed onto the jaw $h$. On the spindle $d$ another nut $a$ is placed, and between the two nuts a ball-bearing $k$ and a flexible ring $m$ are arranged, with a metal disk $l$ between them.

On the nut $a$ and embracing the same is fixed the screw-head $c$, which is cut out on the one side and clamped, by means of clamping-screws $n$, to the nut, so as to be adjustable as desired. The screw-head $c$, as well as the tightening-nut $b$, are provided at the ends which face each other with claws $g$ or $i$, the dimensions of which allow of the nut and the screw-head being rotated to a limited extent in relation to one another.

When the screw-head is rotated, the nut $a$ is screwed up against the nut $b$ and produces pressure between itself and the latter. The rotation of the screw-head is only continued until the friction in the nut $a$ resulting from the pressure of the counter-nuts has become greater than the moving resistance of the movable jaw on the high-pitch spindle $e$. As the rotation proceeds the spindle $d$ and the sleeve $o$, together with the high-pitch nut $p$, are also rotated and the jaws thereby adjusted. On the commencement of an additional resistance between the jaws the two nuts $a$ and $b$ move on the spindle $d$, while the spindle itself remains at rest in the high-pitch nut in consequence of the increased resistance. When the jaws are released—that is, when the screw-head is rotated to the left—the sleeve $o$ and the nut $a$ are rotated and terminate the counter-nut pressure. The claw belonging to $c$ then carries along the nut $b$, and after the nut $a$ has been prevented from moving farther by striking against the stop-disk $q$ the spindle $d$ and therewith the high-pitch nut $p$ are actuated, whereupon the movable jaw of the vise is pushed back quickly.

What we claim, and desire to secure by Letters Patent, is—

1. In a vise, the combination of two screw-spindles of different pitch, a movable jaw connected with the high-pitched spindle, nuts disposed on the low-pitched spindle, a screw-head fixed on one of said nuts, clutches on said head and on the nut on which said head is not mounted to limit their rotation relatively to each other.

2. In a vise, the combination of two screw-spindles of different pitch, a movable jaw connected with the high-pitched spindle, nuts disposed on the low-pitched spindle, a ball-bearing and a flexible intermediate bearing disposed between said nuts, a screw-head fixed on one of said nuts whereby the nuts are pressed against each other and when rotated revolve the screw-spindle to actuate the high-pitched spindle, and clutches on said head and the nut on which it is not mounted to limit their rotation relatively to each other.

In testimony whereof we affix our signatures in presence of two witnesses.

WILHELM BOLEY.
            PAUL PFLEIDERER.

Witnesses:
  G. WEBER,
  ERNST ENTENMANN.